United States Patent [19]

Tajima et al.

[11] Patent Number: 4,506,202
[45] Date of Patent: Mar. 19, 1985

[54] DIGITAL SERVO CIRCUIT

[75] Inventors: Shigeru Tajima, Atsugi; Hiroshi Okada, Sagamihara; Kenji Nakano, Ebina, all of Japan

[73] Assignee: Sony Corporation, Tokyo, Japan

[21] Appl. No.: 508,191

[22] Filed: Jun. 27, 1983

[30] Foreign Application Priority Data

Jun. 30, 1982 [JP] Japan .................................. 57-111568
Jul. 2, 1982 [JP] Japan .................................. 57-115227

[51] Int. Cl.³ ............................................ G05B 19/08
[52] U.S. Cl. ..................................... 318/603; 318/341; 318/599
[58] Field of Search ........................ 318/603, 599, 341

[56] References Cited

U.S. PATENT DOCUMENTS

| | | | |
|---|---|---|---|
| 3,872,369 | 3/1975 | Rich | 318/603 |
| 4,101,817 | 7/1978 | Maeda et al. | 318/603 |
| 4,315,200 | 2/1982 | Yamada et al. | 318/603 |
| 4,366,753 | 1/1983 | Glanz | 318/603 X |
| 4,376,914 | 3/1983 | Kimura | 318/603 |

*Primary Examiner*—B. Dobeck
*Attorney, Agent, or Firm*—Lewis H. Eslinger; Alvin Sinderbrand

[57] ABSTRACT

A digital servo circuit which comprises a first N-bit counter for counting clock pulses at a recurrence frequency corresponding to error data and a second N-bit counter for counting divided recurrence frequency clock pulses at 1/M times the aforementioned recurrence frequency. The digital servo circuit controls the pull-in operation of a servo system with the count output of the second N-bit counter as control data, while it controls the operation of the servo system in the normal phase-locked state thereof with the count outputs of the first and second N-bit counters as control data with the count output of the second N-bit counter changed according to the amount of external disturbance caused to the servo system.

8 Claims, 10 Drawing Figures

DIGITAL SERVO CIRCUIT

BACKGROUND OF THE INVENTION

This invention relates to servo circuits for motors, and more particularly, to a digital servo circuit for controlling the rotation of a motor.

BRIEF DESCRIPTION OF THE PRIOR ART

In the usual servo circuit for controlling the rotation of a motor, a feedback signal representing the rotational speed or rotational phase of the motor and a reference signal are compared to obtain error data used for controlling the motor rotation. FIG. 1 shows a typical rotation control circuit for a motor 1. A frequency generator 2 and a pulse generator 3 are operated according to the rotation of the motor 1 to obtain a frequency signal $f_{FG}$ proportional to the rotational speed of the motor 1 and a phase pulse signal $\phi_{PG}$ representing the rotational phase of the motor 1. These signals are used as the feedback signal noted above. The frequency signal $f_{FG}$ is fed to a speed servo circuit 4, which produces a speed control signal corresponding to the frequency difference between a reference frequency signal $V_{REF}$ representing the goal rotational speed and the frequency signal $f_{FG}$. The phase pulse signal $\phi_{PG}$ is fed to the phase servo circuit 5, which compares a reference pulse signal $\phi_{REF}$ representing a reference rotational phase and the phase pulse signal $\phi_{PG}$ to produce a phase control signal corresponding to the phase difference. The speed control signal and phase control signal are added together in an adder 6 to obtain a rotational control signal. This rotational control signal is used to control the operation of a motor drive circuit 7, whereby the motor 1 is rotated at the goal rotational speed and at a phase locked to the reference phase.

FIG. 2 is a block diagram showing the basic construction of the general digital servo circuit, which may be used as the servo circuit as described. Referring to FIG. 2, a flip-flop circuit 11 is triggered by reference signal $S_{REF}$ and feedback signal $S_{FB}$ to produce window pulses with the pulse duration thereof proportional to the phase difference between the two signals. A measuring counter 14 counts clock pulses supplied from a clock generator 12 through an AND gate 13 which is on-off controlled by the window pulses, and produces a digital count output representing the phase error. This output is fed to a digital-to-analog converter 15. The digital-to-analog converter 15 converts the digital phase error data from the measuring counter 14 into corresponding analog data, which is provided as control signal. To be more specific, the measuring counter 14 counts clock pulses gated with the pulse duration of window pulses, and produces digital data corresponding to an analog ramp representing the phase error as shown in FIG. 3. The amplitude of the ramp output shown in FIG. 3 corresponds to the dynamic range of the servo circuit, and its time axis range corresponds to a lock range. With the digital servo circuit using the measuring counter 14, therefore, the clock frequency has to be increased for finer quantization. In addition, the number of bits of the measuring counter 14 must be increased in order to ensure the same time axis range (i.e., lock range). The increase of bits is further necessary in case where the time axis range is increased with the same clock frequency.

In a drum motor phase servo system for an NTSC system video tape recorder employing a rotary magnetic head assembly, a phase reference signal $\phi_{REF}$ at 30 Hz is used both for recording and reproduction, and the standard ramp output frequency is also 30 Hz. The lock range is set to 3.3. msec., i.e., approximately one-tenth of the recurrence cycle of 1/30 sec. of the ramp output $l_A$. The slope of the ramp output, dynamic range and time axis range are set by taking the conditions of the entire motor rotation control system into consideration. Where a ramp output $l_A$ shown by the solid plot in FIG. 4 is an optimum value, for instance, a ramp output $l_B$ with a reduced time range would lead to an increased servo system gain, so that an oscillatory control state is liable to result. In addition, a departure from the lock range is liable to be caused externally. With a ramp output $l_C$ of an increased time range, on the other hand, the servo system gain is low so that the response is slow. Further, in the normal phase-locked condition of the servo system, it is only necessary to be able to respond to variations no greater than about 10% of the lock range of even the optimum ramp output $l_A$. That is, a major proportion of the lock range is not utilized.

OBJECT AND SUMMARY OF THE INVENTION

An object of the present invention is to provide a digital ramp output of a measuring counter.

A further object of the present invention is to provide a digital servo circuit of a novel construction, in which measuring counters having a small number of bits are used to ensure a lock range and permit sufficient precision of quantization to be normally obtained.

In accord with the present invention, a servo circuit for controlling the rotation of a motor comprises clock means for generating clock pulses, means for generating window pulses in response to the phase difference between reference pulses and pulses corresponding to the rotation of the motor, gate means for gating the clock pulses in response to the window pulses to produce gated pulses, first counter means for counting the gated pulses to produce a first counter signal and divided gated pulses, second counter means for counting the divided gated pulses to produce a second counter signal, and mixing means for producing a mixed signal from the first and second counter signals.

DESCRIPTION OF THE PREFERRED EMBODIMENTS

Figure 1:
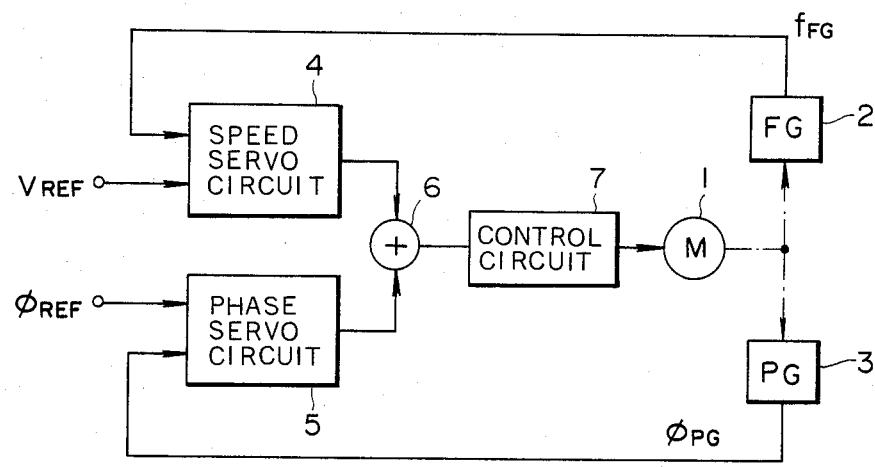
FIG. 1 is a block diagram showing the construction of a general motor rotation control circuit.
Figure 2:
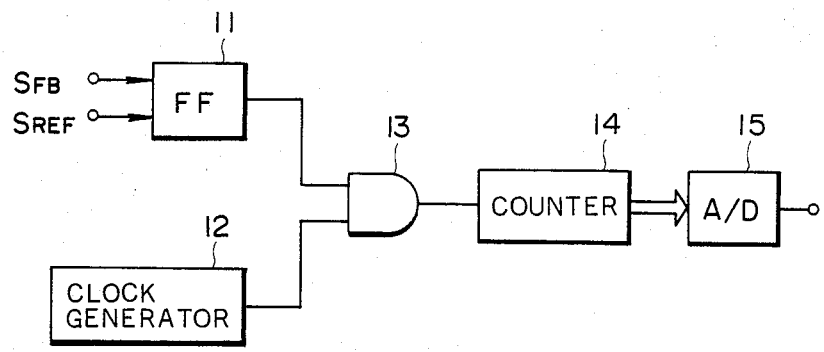
FIG. 2 is a block diagram showing a prior art digital servo circuit.
Figure 3:
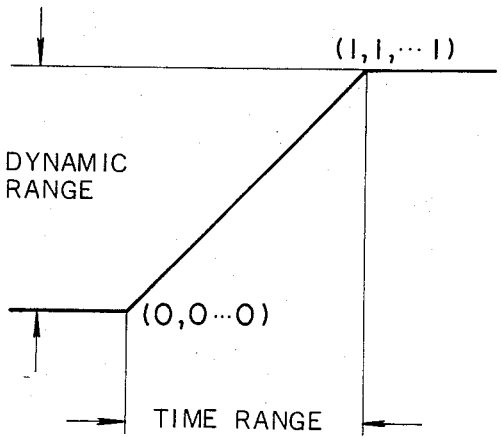
FIGS. 3 and 4 are views for explaining ramp outputs of the prior art digital servo circuit corresponding to phase error data.
Figure 4:
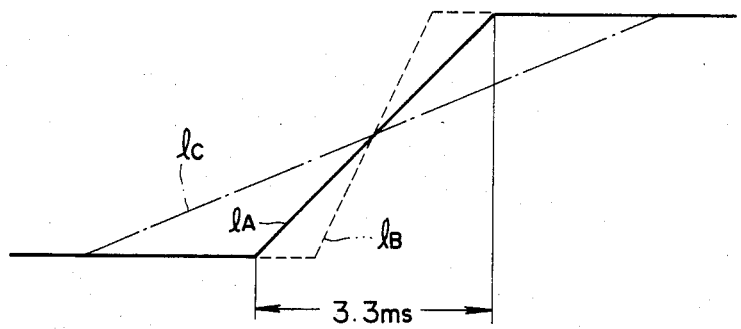
Figure 5:
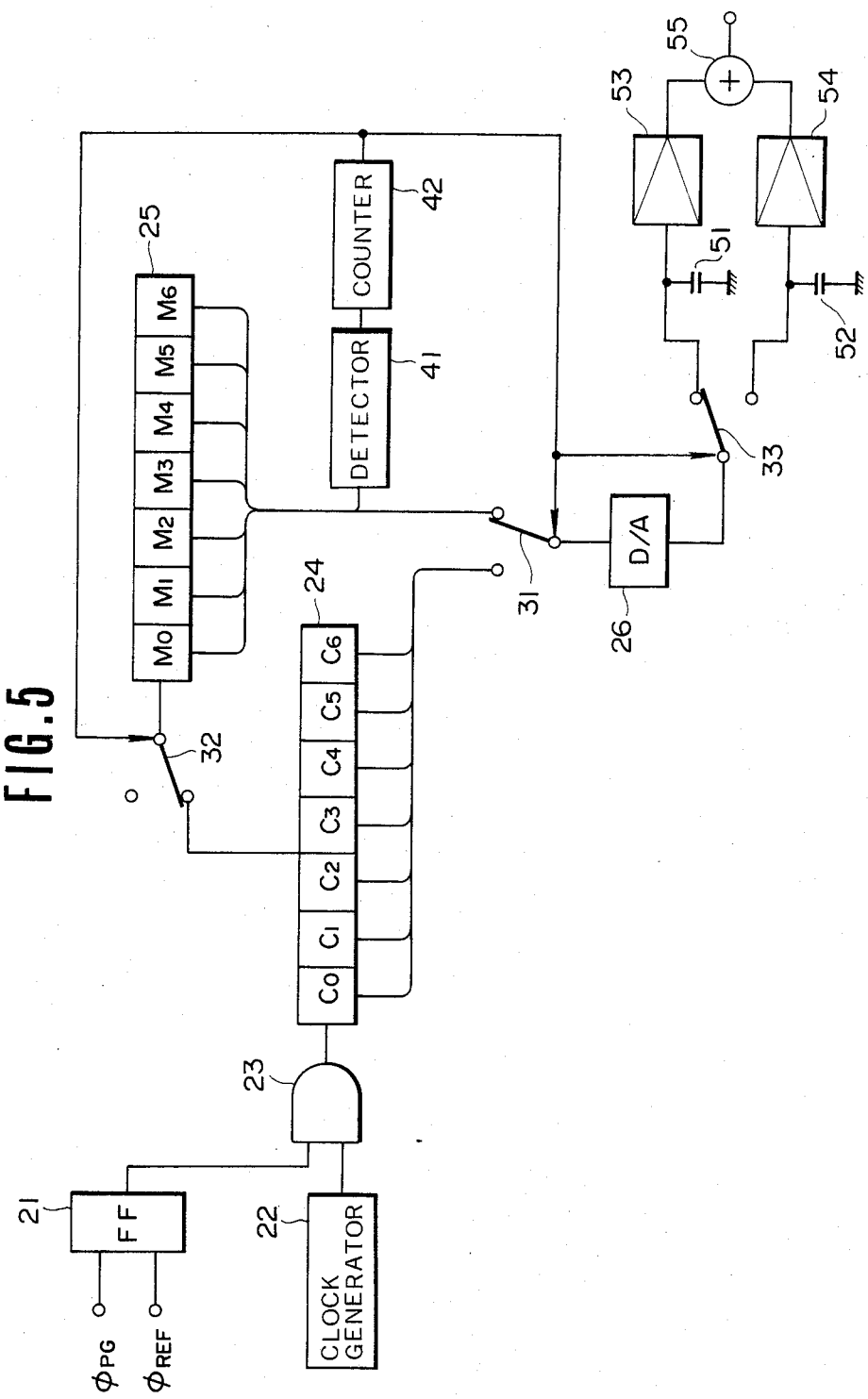
FIG. 5 is a block diagram showing a first embodiment of the digital servo circuit according to the present invention.

FIG. 5 is a block diagram showing a first embodiment of the present invention applied to a phase servo circuit in a motor control circuit. The circuit comprises a 7-bit measuring counter 24, which counts clock pulses provided at a recurrence frequency corresponding to the phase difference between an actual phase pulse signal $\phi_{PG}$ and a reference phase signal $\phi_{REF}$, and a 7-bit memory counter 25 for counting divided recurrence frequency clock pulses at one-eighth the recurrence frequency noted above.

Clock pulses at the recurrence frequency corresponding to the phase difference are fed from a clock pulse generator 22 through an AND gate 23 to the measuring counter 24. To be more specific, the AND gate 23 is gate controlled by window pulses, which are formed by a flip-flop circuit 21 triggered by the actual phase pulse signal $\phi_{PG}$ and reference phase signal $\phi_{REF}$ and have a pulse duration corresponding to the phase difference, and supplies pulses at a recurrence frequency corresponding to the phase difference to the measuring counter 24.

The measuring counter 24 counts the clock pulses supplied through the AND gate 23 to produce a count output as 7-bit digital data representing the phase difference. The count output is fed through a first signal selection circuit 31 to a digital-to-analog converter 26. The measuring counter 24 also supplys as its third bit output a divided recurrence frequency clock pulse output at one-eighth the recurrence frequency noted above through a second signal selection circuit 32 to a memory counter 25.

The memory counter 25 counts the one-eighth recurrence frequency clock pulses to produce a count output as 7-bit digital data representing the phase difference. This count output is fed to a servo state detection circuit 41 and also supplied through the first signal selection circuit 31 to the digital-to-analog converter 26.

The analog output obtained from the digital-to-analog converter 26 is fed through a third signal selection circuit 33 to first and second hold circuits 51 and 52. The hold outputs of the hold circuits 51 and 52 are fed through respective buffer amplifiers 53 and 54 to a signal adder 55. The output of the signal adder 55 is provided as a servo control signal.

The operation of the first to third signal selection circuits 31 to 33 is controlled by a control circuit 42 according to the detection output of the servo state detection circuit 41.

To be more specific, the servo state detection circuit 41 checks whether the servo system is in the normal phase-locked state. Until the servo system is pulled in the phase-locked state after the start of the motor, the signal selection circuits 31 to 33 are controlled by the control circuit 42 such that the memory counter 25 counts the one-eighth recurrence frequency clock pulses from the measuring counter 24 and the digital-to-analog converter 26 converts the count output of the memory counter 25 into a corresponding analog signal which is supplied as the servo control signal. This operation will now be described with reference to FIG. 6.

Until the servo system is pulled in the lock range, the count output of the memory counter 25 is used as phase error data. The memory counter 25 counts the one-eighth recurrence frequency clock pulses from the measuring counter 24, so that it can provide phase error data of a wide lock range $L_1$ as shown by the solid line in FIG. 6.

The count output of the memory counter 25 is used as control data to control the servo system pull-in operation. When the normal phase-locked state of the servo system is brought about, the memory counter 25 memorizes the prevailing count. In this normal state of the servo, the count output of the memory counter 25 and the contents of the measuring counter 25 are alternately supplied through the first signal selection circuit 31 to the digital-to-analog circuit 26. The memory counter 25 provides data about the DC bias of the servo system in the normal state thereof. The measuring counter 24, on the other hand, provides phase error data of a narrow lock range $L_2$ as shown by the dashed line in FIG. 6.

Figure 6:
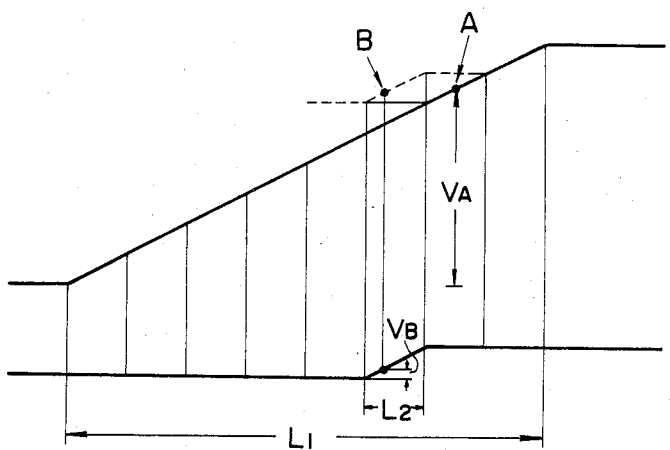
FIG. 6 is a view for explaining the operation of the embodiment of FIG. 5.

It is assumed that the servo system is locked in phase at point A in FIG. 6 by the ramp output of the wide lock range $L_1$ provided from the memory counter 25. The count of the memory counter 25 corresponding to the driving voltage $V_A$ being applied at this time is memorized, and the motor is driven by a driving voltage $V_B$ corresponding to the ramp output of the narrow lock range $L_2$ provided by the measuring counter 24 and the driving voltage $V_A$ noted above, whereby the servo system is phase locked at a point B in FIG. 6. The phase servo system is intended to be phase locked at a certain point in a predetermined lock range. With this embodiment having the construction described above, a wide lock range of the servo system pull-in control can be obtained with the counters 24 and 25 and digital-to-analog converter 26 which have a small number of bits. In addition, in the normal state it is possible to obtain phase servo control of high precision and less quantization error.

Figure 7:
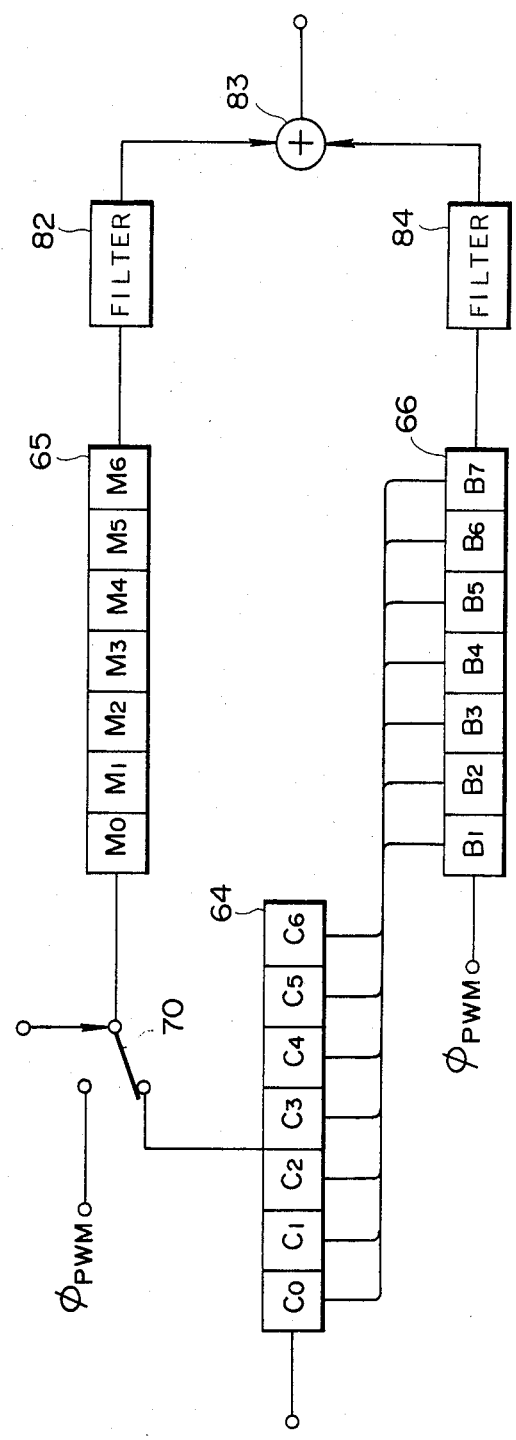
FIG. 7 is a block diagram showing a second embodiment of the digital servo circuit according to the present invention.

In the above first embodiment, the 7-bit phase error data obtained from the counters 24 and 25 is converted into the analog signal by the digital-to-analog converter 26. FIG. 7 shows a second embodiment of the present invention, in which phase error signal is handled as pulse duration modulation signal.

More specifically, in the embodiment of FIG. 7 the count output of a measuring counter 64 which counts clock pulses is fed to a ring counter 66 for pulse duration modulation. The ring counter 66 produces phase error data in the form of a pulse duration modulation signal. This data is fed through a filter 84 to a signal adder 83. A memory counter 65 counts one-eighth recurrence frequency clock pulses from the measuring counter 64. The ring counter 66 is operated by presetting the count content of the counter 65 for producing pulse duration modulation signal corresponding to phase error data. The pulse duration modulation signal is fed through a filter 82 to the signal adder 83. A clock signal $\phi_{PWM}$ for the pulse duration modulation and the one-eighth recurrence frequency division clock pulse signal from the measuring counter 64 are selectively supplied through a signal selection circuit 70 to the memory counter 65. The servo control obtainable with this embodiment is principally the same as the servo control in the preceding first embodiment shown in FIG. 5.

More specifically, the phase error data provided as the pulse duration modulation signal from the memory counter 65 is used as control data for the servo system pull-in control, and in its normal state the servo system is lightly precisely controlled by control data that is obtained by adding together the pulse duration modulation signals from the counters 64 and 65.

Figure 8:
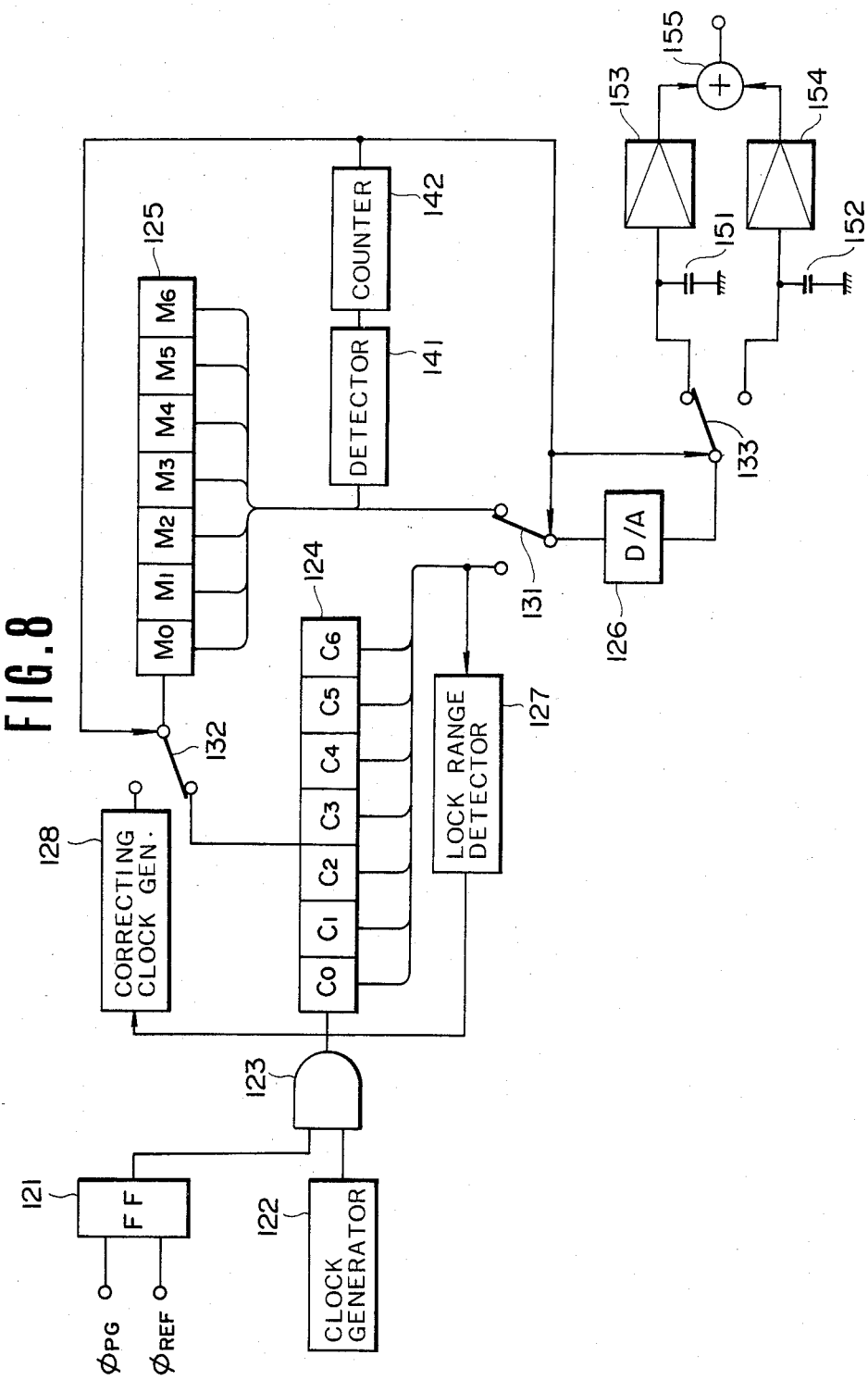
FIG. 8 is a block diagram showing a third embodiment of the digital servo circuit according to the present invention.

FIG. 8 shows a third embodiment of the present invention. In this instance, a lock range detection circuit 127 and a corrected clock pulse generator 128 are added to the first embodiment of FIG. 5.

In this embodiment, a flip-flop circuit 121 is triggered by a phase pulse signal $\phi_{PG}$ and reference phase signal $\phi_{REF}$ to produce window pulses having a pulse duration corresponding to the phase error. Clock pulses provided from a clock pulse generator 122 at a recurrence frequency corresponding to the phase error are supplied to a measuring counter 124 through an AND gate 123, which is gate controlled by the window pulses noted above.

The measuring counter 124 counts the clock pulses supplied through the AND gate 123, and provides a count output as 7-bit digital data representing the phase error. This count output is fed to the lock range detection circuit 127 and also fed through a first signal selection circuit 131 to a digital-to-analog converter 126. The measuring counter 124 provides as its third bit output a one-eighth recurrence frequency clock pulse output which is supplied through a second signal selection circuit 132 to a memory counter 125. The lock range detection circuit 127 detects an insensitive zone $L_3$ which is set in a lock range $L_2$ provided by the measuring counter 124, and its detection output is used to operate the corrected clock pulse generator 128. The corrected clock pulse generator 128 feeds corrected clock pulses representing a deviation corresponding to the insensitive zone $L_3$ through a second signal selection circuit 132 to the memory counter 125.

The memory counter 125 counts the one-eighth recurrence frequency clock pulses noted above and provides a count output as 7-bit digital data representing the phase error. This count output is fed to a servo state detection circuit 141 and also fed through the first signal selection circuit 131 to the digital-to-analog converter 126.

The analog output obtained from the digital-to-analog converter 126 is fed through a third signal selection circuit 133 to the first and second hold circuits 151 and 152. The hold outputs of the hold circuits 151 and 152 are fed through respective buffer amplifiers 153 and 154 to a signal adder 155 to be provided therefrom as a servo control signal.

The operation of the first to third signal selection circuits 131 to 133 is controlled by a control circuit 142 which is operated according to the detection output of the servo state detection circuit 141.

Figure 9:
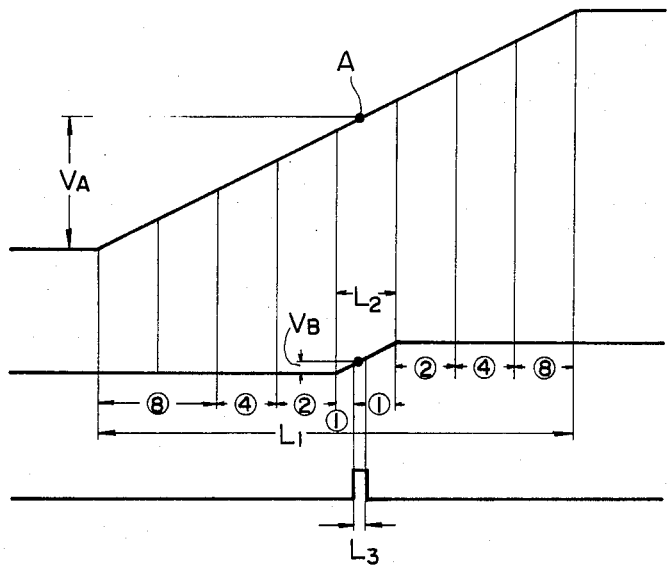
FIG. 9 is a view for explaining the operation of the embodiment of FIG. 8.
Figure 10:
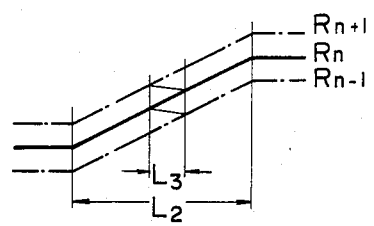
FIG. 10 is a view for explaining a ramp output selecting operation of the embodiment of FIG. 8.

The servo state detection circuit 142 checks whether the servo system is in its normal phase-locked state. Until the servo system is pulled into the phase-locked state after the start of the motor, the operation of the signal selection circuits 131 to 133 is controlled by the control circuit 142 such that the memory counter 125 counts the one-eighth recurrence frequency division clock pulses from the measuring counter 124 and the digital-to-analog converter 126 converts the count output into a corresponding analog signal to be supplied as servo control signal. This operation is shown in FIG. 9.

More specifically, until the servo system is pulled in the lock range, the count output of the counter 125 is used as phase error data. Since the counter 125 is counting the one-eighth recurrence frequency clock pulses from the measuring counter 124, it provides phase error data of a wide lock range $L_1$ as shown by the solid line in FIG. 9.

The servo system pull-in operation is controlled by the count output of the memory counter 125 as the control data. When the servo state detection circuit 141 detects that the servo system is pulled in the lock range $L_1$, its detection output causes the control circuit 142 to alternately operate the first and third signal selection circuits 131 and 133 and also let the second signal selection circuit 132 select the corrected clock pulse generator 128. In this state, the content of the memory counter 125 is supplied as servo system DC bias data, and a servo control signal providing phase data of a narrow lock range $L_2$ as shown in FIG. 9 is obtained from the count output of the counter 124. The content of the memory counter 125, i.e., the DC bias data, is progressively corrected by the corrected clock pulses from the corrected clock pulse generator 128. When the servo system is pulled in the insensitive zone $L_3$ in the lock range $L_2$ provided by the measuring counter 124, it is phase locked.

There are $2^7 = 128$ different ramp outputs $R_n$ that can be provided as the servo control signal based on the DC bias data provided from the 7-bit memory counter 125 and the phase error data provided from the 7-bit measuring counter 124, and an optimum ramp output is selected according to the external disturbance of the servo system. The insensitive zone $L_3$ that is detected by the lock range detection circuit 27 is set to have a width less than the permissible error from the goal lock phase, and is also set such that at least one ramp output is present in one step of the DC bias provided from the memory counter 125. The corrected clock pulse generator 128 which is operated according to the detection output of the lock range detection circuit 127 is adapted to provide a single corrected clock pulse when the lock point is in the lock range $L_2$ but is outside the insensitive zone $L_3$ (i.e., in a region ①) in FIG. 9, while providing a number of corrected clock pulses when the lock point is greatly deviated from the lock range $L_2$ due to a great external disturbance or the like. This arrangement permits improvement of the response speed of the servo system to external disturbances. In the example of FIG. 9, two, four and eight corrected clock pulses are provided when the lock point is in regions ②, ④ and ⑧ respectively.

It is to be appreciated that a ramp output with a wide lock range $L_1$ provided by the memory counter 125 is used to phase lock the servo system while memorizing the count of the memory counter 125 corresponding to the prevailing driving voltage $V_A$ applied to the motor, and the motor is driven by a driving voltage $V_B$ corresponding to a ramp output $R_n$ with a narrow lock range $L_1$ provided from the measuring counter 124 and the driving voltage $V_A$ noted above, whereby the servo system is phase locked at point A in FIG. 9. The phase servo system is intended to be phase locked at a certain point in a predetermined lock range. With the above embodiment, quick control of the pull-in operation of the servo system in a wide lock range can be obtained with the counters 124 and 125 and digital-to-analog converter 126, which have a small number of bits, while highly precise phase servo control with less quantization error normally can be obtained.

As has been described in the foregoing, according to the present invention a first N-bit counter for counting clock pulses at a recurrence frequency corresponding to error data and a second N-bit counter for counting divided recurrence frequency clock pulses at 1/M times the aforementioned recurrence frequency are used for controlling the pull-in operation of servo system with the count output of the second N-bit counter as control data while controlling, in the normal phase-locked state of the servo system, the operation of the servo system with the count outputs of the first and second N-bit counters as control data and with the count output of the second N-bit counter changed according to the amount caused to external disturbance of the servo system. Thus, it is possible to quickly pull the servo system in a wide lock range while normally highly precise digital servo control with less quantization error can be obtained. Further, the digital servo control can be obtained with counters having a small number of bits.

What is claimed is:

1. A servo circuit for producing a servo control signal for controlling the rotation of a motor comprising:
   clock means for generating clock pulses;
   a source of reference pulses;
   a source of pulses corresponding to said rotation of said motor;
   means for generating window pulses in response to the phase difference between said reference pulses and said pulses corresponding to said rotation of said motor;
   gate means for gating said clock pulses in response to said window pulses to produce gated pulses;
   first counter means for counting said gated pulses to produce a first counter signal and generating divided gated pulses;
   second counter means for counting said divided gated pulses to produce a second counter signal; and
   mixing means for producing a mixed signal from said first and second counter signals as said servo control signal.

2. The servo circuit of claim 1; and further comprising:
   means for detecting when said motor is phase-locked and generating an indicator signal in response thereto; and
   switch means responsive to said indicator signal for supplying one of said first and second counter signals to said mixing means.

3. The servo circuit of claim 2; wherein said first and second counter signals are digital signals; and wherein said mixing means includes:
   digital to analog converting means for converting said first and second counter signals to first and second analog signals, respectively;
   first and second hold circuit means for producing first and second held signals, respectively;
   second switch means in addition to the first-mentioned switch means responsive to said indicator signal for supplying said first and second analog signals to said first and second hold circuit means; and
   adder means for adding said first and second held signals.

4. The servo circuit of claim 2; and further comprising means for supplying said second counter signal to said means for detecting.

5. A servo circuit for producing a servo control signal for controlling the rotation of a motor comprising:
   clock means for generating clock pulses;
   a source of reference pulses;
   a source of pulses corresponding to said rotation of said motor;
   means for generating window pulses in response to the phase difference between said reference pulses and said pulses corresponding to said rotation of said motor;
   gate means for gating said clock pulses in response to said window pulses to produce gated pulses;
   first counter means for counting said gated pulses to produce a first counter signal and generating divided gated pulses;
   second counter means for counting said divided gated pulses to produce a second counter signal;
   mixing means for producing a mixed signal form said first and second counter signals as said servo control signal;
   means for detecting when said motor is phase-locked and generating an indicator signal in response thereto;
   first switch means responsive to said indicator signal for supplying one of said first and second counter signals to said mixing means;
   lock range detector means responsive to said first counter signal for detecting a lock range of said motor to produce a detected lock range signal;
   corrected clock generator means responsive to said detected lock range signal for generating corrected clock pulses; and
   second switch means responsive to said indicator signal for supplying said corrected clock pulses in place of said divided gated pulses to said second counter means.

6. A servo circuit for producing a servo control signal for controlling the rotation of a motor comprising:
   a source of first clock pulses;
   a source of second clock pulses;
   first counter means for counting said first clock pulses to produce a first counter signal;
   second counter means responsive to said second clock pulses and said first counter signal for producing a first pulse duration modulation signal;
   third counter means responsive to said second clock pulses and said divided first clock pulses for producing a second pulse duration modulation signal; and
   adding means for adding said first and second pulse duration modulation signals to produce said servo control signal.

7. The servo circuit of claim 6; and further comprising switch means for supplying one of said second clock pulses and said divided first clock pulses to said third counter means.

8. The servo circuit of claim 6; and further comprising filter means for filtering said first and second pulse duration modulation signals.

* * * * *